United States Patent
Li et al.

(10) Patent No.: US 12,338,132 B1
(45) Date of Patent: Jun. 24, 2025

(54) METHOD FOR PREPARING AMORPHOUS HIERARCHICALLY POROUS UiO-66

(71) Applicant: SHENZHEN POLYTECHNIC UNIVERSITY, Shenzhen (CN)

(72) Inventors: Xiaolin Li, Shenzhen (CN); Shilin Li, Shenzhen (CN); Wei Chen, Shenzhen (CN); Liang Zhang, Shenzhen (CN); Tao Gong, Shenzhen (CN)

(73) Assignee: SHENZHEN POLYTECHNIC UNIVERSITY, Shenzhen (CN)

( * ) Notice: Subject to any disclaimer, the term of this patent is extended or adjusted under 35 U.S.C. 154(b) by 0 days.

(21) Appl. No.: 18/891,261

(22) Filed: Sep. 20, 2024

(30) Foreign Application Priority Data

Mar. 14, 2024 (CN) .......................... 202410295395.6

(51) Int. Cl.
  *C01G 25/02* (2006.01)
(52) U.S. Cl.
  CPC .......... *C01G 25/02* (2013.01); *C01P 2002/02* (2013.01); *C01P 2002/30* (2013.01); *C01P 2002/72* (2013.01)
(58) Field of Classification Search
  CPC .................................................. C01G 25/02
  See application file for complete search history.

(56) References Cited

U.S. PATENT DOCUMENTS

2024/0399336 A1\* 12/2024 Giri ..................... B01J 20/28047

OTHER PUBLICATIONS

Office Action for Chinese Application No. 202410295395.6 mailed Aug. 20, 2024.

\* cited by examiner

*Primary Examiner* — James A Fiorito
(74) *Attorney, Agent, or Firm* — Dorsey & Whitney LLP

(57) ABSTRACT

A method for preparing an amorphous hierarchically porous UiO-66 is provided. Ammonium fluoride is added to promote dissolution of terephthalic acid (TPA) in water, and then zirconium nitrate is dissolved in water. Polyethylene glycol (PEG) shows high hydrophilicity, and ethoxy repeating unit in the PEG interacts with zirconium ions, thus promoting coordination self-assembly of metal ions and organic ligands. The zirconium ions react with carboxyl groups of the TPA through coordination. The coordination is achieved through chemical bonding between the zirconium ions and carboxyl oxygen atoms, thereby forming preliminary coordination polymer structures. As the coordination proceeds, these preliminary coordination polymer structures begin to self-assemble into short-range ordered network structures, in which water molecules act as a medium to help the zirconium ions and organic ligands ligate in space, thereby generating the amorphous hierarchically porous UiO-66.

10 Claims, 3 Drawing Sheets

METHOD FOR PREPARING AMORPHOUS HIERARCHICALLY POROUS UiO-66

CROSS-REFERENCE TO RELATED APPLICATION

This patent application claims the benefit and priority of Chinese Patent Application No. 202410295395.6 filed with the China National Intellectual Property Administration on Mar. 14, 2024, the disclosure of which is incorporated by reference herein in its entirety as part of the present application.

TECHNICAL FIELD

The present disclosure belongs to the technical field of metal organic framework (MOF) synthesis, and particularly relates to a method for preparing an amorphous hierarchically porous UiO-66.

BACKGROUND

Metal-organic frameworks (MOFs) are a class of porous materials with high specific surface area, adjustable pore structure, and desirable chemical stability, and are prepared by ligating metal ion clusters and multi-point organic ligands through coordination bonds. The MOFs include crystalline MOFs and amorphous MOFs. The amorphous MOFs exhibit relatively high energy states, have abundant defect sites, and could provide isotropic ion conduction pathways. In recent years, the amorphous MOFs have been widely used in the fields of reversible gas storage, irreversible long-term storage of hazardous substances, optically active glass, and catalysis.

However, the current synthesis of the amorphous MOFs generally requires high temperature, high pressure, mechanical ball milling, and chemical corrosion to convert the crystalline MOFs into the amorphous MOFs.

UiO-66, as a three-dimensional zirconium-based MOF, has high specific surface area, thermal stability, and chemical stability, and could maintain its crystalline morphology even when being exposed to high external pressure. Such excellent stability could be attributed to the strong Zr—O bonds and compact cubic close-packed structure. However, preparation conditions of amorphous UiO-66 are correspondingly more stringent, and it is impossible to prepare the amorphous UiO-66 under cell survival conditions to achieve application in the biological field.

SUMMARY

An object of the present disclosure is to provide a method for preparing an amorphous hierarchically porous UiO-66. In the present disclosure, the method has mild conditions and could prepare the amorphous hierarchically porous UiO-66 under cell survival conditions.

To achieve the above object, the present disclosure provides the following technical solutions.

The present disclosure provides a method for preparing an amorphous hierarchically porous UiO-66, including the following steps:
(1) subjecting polyethylene glycol (PEG), zirconium nitrate, and water to first heating mixing to obtain a metal solution;
(2) subjecting ammonium fluoride, terephthalic acid (TPA), and water to second heating mixing to obtain a ligand solution; and
(3) mixing the metal solution and the ligand solution, and subjecting a resulting mixture to coordination at a temperature of 15° C. to 37° C. under normal pressure to obtain the amorphous hierarchically porous UiO-66;
where, steps (1) and (2) are conducted in any order.

In some embodiments, in step (1), the PEG is PEG400, the zirconium nitrate is $Zr(NO_3)_4 \cdot 5H_2O$, and the water is deionized water.

In some embodiments, in step (1), a volume ratio of the PEG to the water is in a range of (0.1-10):(0.1-10).

In some embodiments, in step (1), a mass ratio of the water to the zirconium nitrate is in a range of (0.1-10):(0.8-2.5).

In some embodiments, the first heating mixing is conducted by stirring at a temperature of 60° C. to 90° C. and a rotating speed of 500 rpm to 1,000 rpm for 0.5 h to 3 h.

In some embodiments, in step (2), a mass ratio of the ammonium fluoride to the TPA is in a range of (0.5-1.5):(0.1-0.3).

In some embodiments, in step (2), a mass ratio of the ammonium fluoride to the water is in a range of (0.5-1.5):20.

In some embodiments, the second heating mixing is conducted by stirring at a temperature of 60° C. to 90° C. and a rotating speed of 500 rpm to 1,000 rpm for 0.5 h to 3 h.

In some embodiments, a molar ratio of the zirconium nitrate to the TPA is in a range of (1-40):1.

In some embodiments, the coordination is conducted by stirring at a rotating speed of 500 rpm to 1,000 rpm for 24 h to 72 h.

The present disclosure provides a method for preparing an amorphous hierarchically porous UiO-66. In the present disclosure, ammonium fluoride ($NH_4F$) is added to promote the dissolution of a poorly soluble organic ligand (TPA) in water, and then a water-soluble metal salt (zirconium nitrate) is dissolved in water. PEG shows high hydrophilicity, and ethoxy repeating unit in the PEG interacts with $Zr^{4+}$, thus promoting coordination self-assembly of metal ions and organic ligands, and realizing the preparation of the amorphous hierarchically porous UiO-66 under room temperature and normal pressure. In solution, the metal ions ($Zr^{4+}$) react with carboxyl groups of the organic ligand (TPA) through coordination. The coordination is achieved through chemical bonding between the metal ions and carboxyl oxygen atoms, thereby forming preliminary coordination polymer structures. As the coordination proceeds, these preliminary coordination polymer structures begin to self-assemble into short-range ordered network structures, in which water molecules act as a medium to help the metal ions and organic ligands ligate in space, thereby generating the amorphous hierarchically porous UiO-66.

In the amorphous hierarchically porous UiO-66 provided by the present disclosure, some chemical bonds ligating micropores are in a non-ligated state in amorphous structure, such that pore size becomes larger to form mesopores, resulting in coexistence of the mesopores and micropores, that is, the phenomenon of hierarchical pores.

In the present disclosure, the method allows the preparation of the amorphous hierarchically porous UiO-66 at room temperature and normal pressure in an aqueous system, and has simple steps, high efficiency, and desirable biocompatibility, thereby avoiding high energy consumption and toxic solvents in traditional methods. The present disclosure provides new possibilities for the application of MOFs in the biomedical field, especially in drug delivery bioimaging and cell therapy. The MOFs synthesized by the method of the present disclosure could be more safely applied in vivo, providing a new material basis for research and clinical applications.

BRIEF DESCRIPTION OF THE DRAWINGS

To describe the technical solutions in embodiments of the present disclosure or in the prior art more clearly, the drawings required for the embodiments are briefly described below. Apparently, the drawings in the following description show merely some embodiments of the present disclosure, and those of ordinary skill in the art may still derive other drawings from these drawings without creative efforts.

DETAILED DESCRIPTION OF THE EMBODIMENTS

Figure 1:
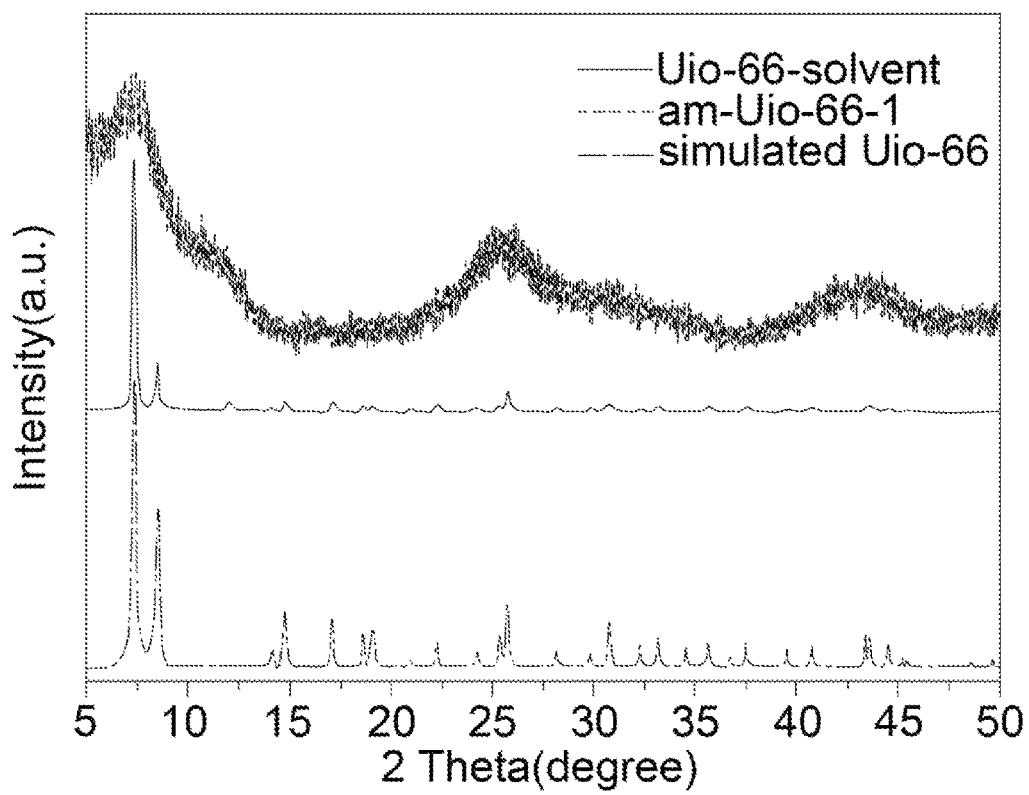
FIG. 1 shows a comparison of X-ray diffraction (XRD) patterns of the amorphous hierarchically porous UiO-66 prepared in Example 1 and the crystalline UiO-66 prepared in Comparative Example 1 of the present disclosure.

The present disclosure provides a method for preparing an amorphous hierarchically porous UiO-66, including the following steps:

(1) subjecting PEG, zirconium nitrate, and water to first heating mixing to obtain a metal solution;

(2) subjecting ammonium fluoride, TPA, and water to second heating mixing to obtain a ligand solution; and (3) mixing the metal solution and the ligand solution, and subjecting a resulting mixture to coordination at a temperature of 15° C. to 37° C. under normal pressure to obtain the amorphous hierarchically porous UiO-66;

where steps (1) and (2) are conducted in any order.

In the present disclosure, PEG, zirconium nitrate, and water are subjected to first heating mixing to obtain a metal solution. In some embodiments of the present disclosure, the PEG is PEG400, the zirconium nitrate is $Zr(NO_3)_4 \cdot 5H_2O$, and the water is deionized water.

In some embodiments of the present disclosure, a volume ratio of the PEG to the water is in a range of (0.1-10):(0.1-10), preferably (0.5-8):(0.5-8), and more preferably (1-5): (1-5).

In some embodiments of the present disclosure, a mass ratio of the water to the zirconium nitrate is in a range of (0.1-10):(0.8-2.5), preferably (0.8-8):(1.2-2.0), and more preferably (2-5):(1.5-1.7).

In some embodiments of the present disclosure, the first heating mixing includes: mixing the water and the PEG to obtain a mixed solution, and then mixing the zirconium nitrate with the mixed solution.

In some embodiments of the present disclosure, the first heating mixing is conducted by stirring at a temperature of 60° C. to 90° C., preferably 70° C. to 80° C., and more preferably 75° C. In some embodiments of the present disclosure, the first heating mixing is conducted at a rotating speed of 500 rpm to 1,000 rpm, preferably 600 rpm to 900 rpm, and more preferably 700 rpm to 800 rpm. In some embodiments of the present disclosure, the first heating mixing is conducted for 0.5 h to 3 h, preferably 1 h to 2.5 h, and more preferably 1.5 h to 2 h.

In some embodiments of the present disclosure, after the first heating mixing is completed, the method further includes cooling the metal solution. In some embodiments, a final temperature for the cooling is room temperature.

In the present disclosure, ammonium fluoride, TPA, and water are subjected to second heating mixing to obtain a ligand solution. In some embodiments of the present disclosure, the water is deionized water.

In some embodiments of the present disclosure, a mass ratio of the ammonium fluoride to the TPA is in a range of (0.5-1.5):(0.1-0.3), preferably (0.7-1.2):(0.1-0.3), and more preferably (0.8-1.0): 0.2.

In some embodiments of the present disclosure, a mass ratio of the ammonium fluoride to the water is in a range of (0.5-1.5): 20, preferably (0.7-1.2): 20, and more preferably (0.9-1.1): 20.

In some embodiments of the present disclosure, the second heating mixing includes: mixing the ammonium fluoride with the water, and then mixing a resulting mixed solution with the TPA.

In some embodiments of the present disclosure, the second heating mixing is conducted by stirring at a temperature of 60° C. to 90° C., preferably 70° C. to 80° C., and more preferably 75° C. In some embodiments of the present disclosure, the second heating mixing is conducted at a rotating speed of 500 rpm to 1,000 rpm, preferably 600 rpm to 900 rpm, and more preferably 700 rpm to 800 rpm. In some embodiments of the present disclosure, the second heating mixing is conducted for 0.5 h to 3 h, preferably 1 h to 2.5 h, and more preferably 1.5 h to 2 h.

In some embodiments of the present disclosure, after the second heating mixing is completed, the method further includes cooling the ligand solution. In some embodiments, a final temperature for the cooling is room temperature.

In the present disclosure, after the metal solution and the ligand solution are obtained, the metal solution and the ligand solution are mixed, and a resulting mixture is subjected to coordination at a temperature of 15° C. to 37° C. under normal pressure to obtain an amorphous hierarchically porous UiO-66. In some embodiments of the present disclosure, a molar ratio of the zirconium nitrate to the TPA is in a range of (1-40): 1, preferably (7-30): 1, and more preferably (10-20): 1.

In some embodiments of the present disclosure, the coordination is conducted by stirring at a rotating speed of 500 rpm to 1,000 rpm, preferably 600 rpm to 900 rpm, and more preferably 700 rpm to 800 rpm. In some embodiments of the present disclosure, the coordination is conducted for 24 h to 72 h, preferably 36 h to 60 h, and more preferably 48 h.

In some embodiments of the present disclosure, the coordination is conducted at a temperature of 18° C. to 35° C., preferably 21° C. to 30° C., and more preferably 24° C. to 26° C.

In some embodiments of the present disclosure, after the coordination is completed, the method further includes subjecting a resulting reaction system to a post-treatment. The post-treatment includes: subjecting the resulting reaction system to solid-liquid separation, and then subjecting a resulting solid to washing, centrifuging, filtering, and first drying in sequence.

In some embodiments of the present disclosure, the solid-liquid separation is conducted by centrifugation at a rotating speed of 1,000 rpm to 5,000 rpm, preferably 2,000 rpm to 4,000 rpm, and more preferably 3,000 rpm. In some embodiments of the present disclosure, the solid-liquid separation is conducted for 5 min to 30 min, preferably 10 min to 25 min, and more preferably 15 min to 20 min.

In some embodiments of the present disclosure, the washing is conducted 1 to 5 times, preferably 2 to 4 times, and more preferably 3 times. In some embodiments of the present disclosure, a washing reagent is an ethanol solution with a volume fraction of 95%. In some embodiments of the present disclosure, a mass-to-volume ratio of the solid to the ethanol is in a range of 1 g:(1-3) mL, and preferably 1 g: 2 mL.

In some embodiments of the present disclosure, the first drying is conducted in an oven at a temperature of 60° C. to 90° C., preferably 70° C. to 80° C. In some embodiments of the present disclosure, the first drying is conducted for 6 h to 24 h, and preferably 10 h to 16 h.

In the present disclosure, unreacted substances, impurities, or solvent molecules attached to surfaces or pores of the UiO-66 are removed by the post-treatment.

In some embodiments of the present disclosure, after the post-treatment is completed, the method further includes grinding a resulting solid into a powder, and then subjecting the powder to second drying.

In some embodiments of the present disclosure, the second drying is conducted in an oven at a temperature of 60° C. to 90° C., preferably 70° C. to 80° C. In some embodiments of the present disclosure, the second drying is conducted for 6 h to 24 h, and preferably 10 h to 16 h.

In the present disclosure, the method allows the preparation of the amorphous hierarchically porous UiO-66, which has not only a microporous structure but also a mesoporous structure, where a micropore size is about 0.69 nm and a mesopore size is about 3.56 nm.

In order to further illustrate the present disclosure, the technical solutions provided by the present disclosure are described in detail below with reference to drawings and examples, but these drawings and examples should not be understood as limiting the scope of the present disclosure.

Example 1

(1) 2.5 mL of deionized water and 2.5 mL of a PEG400 solution were thoroughly mixed. 0.9193 g of $Zr(NO_3)_4·5H_2O$ was dissolved in a resulting mixed solution and then stirred at 80° C. at 500 r/min to 1,000 r/min for 1 h. A resulting mixture was cooled to room temperature to obtain a colorless and transparent metal solution.
(2) 0.765 g of $NH_4F$ was dissolved in 20 mL of deionized water and stirred thoroughly. 0.1 g of TPA was dissolved in a resulting $NH_4F$ solution and then stirred at 80° C. and 500 r/min for 1 h. A resulting mixture was cooled to room temperature to obtain a colorless and transparent ligand solution.
(3) 5 mL of the ligand solution obtained in step (2) and the metal solution obtained in step (1) were mixed, where a molar ratio of the $Zr(NO_3)_4·5H_2O$ to the TPA was 14.288:1. A resulting system was stirred at room temperature and 500 r/min for 48 h. A resulting product solution was centrifuged at 3,000 r/min for 10 min. A resulting supernatant was removed to obtain a white precipitate.
(4) The white precipitate obtained in step (3) was washed 3 times with an ethanol solution in a 95% volume fraction, where a mass-to-volume ratio of the white precipitate to the ethanol was 1 g: 2 mL, and a resulting washed system was then centrifuged, filtered, and dried in an oven at 80° C. for 12 h. A resulting dried solid was ground into a powder, and then vacuum-dried at 80° C. for 12 h to obtain an amorphous hierarchically porous UiO-66, labeled as am-UiO-66-1.

Example 2

(1) 5 mL of deionized water and 0.05 mL of a PEG400 solution were thoroughly mixed. 0.9193 g of $Zr(NO_3)_4·5H_2O$ was dissolved in a resulting mixed solution and then stirred at 80° C. at 500 r/min to 1,000 r/min for 1 h. A resulting mixture was cooled to room temperature to obtain a colorless and transparent metal solution.
(2) 0.1 g of $NH_4F$ was dissolved in 20 mL of deionized water and stirred thoroughly. 0.036 g of TPA was dissolved in a resulting $NH_4F$ solution and then stirred at 80° C. and 500 r/min for 1 h. A resulting mixture was cooled to room temperature to obtain a colorless and transparent ligand solution.
(3) 5 mL of the ligand solution obtained in step (2) and the metal solution obtained in step (1) were mixed, where a molar ratio of the $Zr(NO_3)_4·5H_2O$ to the TPA was 40:1. A resulting system was stirred at room temperature and 500 r/min for 48 h. A resulting product solution was centrifuged at 3,000 r/min for 10 min. A resulting supernatant was removed to obtain a white precipitate.
(4) The white precipitate obtained in step (3) was washed 3 times with an ethanol solution in a 95% volume fraction, where a mass-to-volume ratio of the white precipitate to the ethanol was 1 g: 2 mL, and a resulting washed system was then centrifuged, filtered, and dried in an oven at 80° C. for 12 h. A resulting dried solid was ground into a powder, and then vacuum-dried at 80° C. for 12 h to obtain an amorphous hierarchically porous UiO-66, labeled as am-UiO-66-2.

Example 3

(1) 0.05 mL of deionized water and 5 mL of a PEG400 solution were thoroughly mixed. 0.065 g of $Zr(NO_3)_4·5H_2O$ was dissolved in a resulting mixed solution and then stirred at 80° C. at 500 r/min to 1,000 r/min for 1 h. A resulting mixture was cooled to room temperature to obtain a colorless and transparent metal solution.
(2) 0.765 g of $NH_4F$ was dissolved in 20 mL of deionized water and stirred thoroughly. 0.1 g of TPA was dissolved in a resulting $NH_4F$ solution and then stirred at 80° C. and 500 r/min for 1 h. A resulting mixture was cooled to room temperature to obtain a colorless and transparent ligand solution.
(3) 5 mL of the ligand solution obtained in step (2) and the metal solution obtained in step (1) were mixed, where a molar ratio of the $Zr(NO_3)_4·5H_2O$ to the TPA was 1:1. A resulting system was stirred at room temperature and 500 r/min for 48 h. A resulting product solution was centrifuged at 3,000 r/min for 10 min. A resulting supernatant was removed to obtain a white precipitate.
(4) The white precipitate obtained in step (3) was washed 3 times with an ethanol solution in a 95% volume fraction, where a mass-to-volume ratio of the white precipitate to the ethanol was 1 g: 2 mL, and a resulting washed system was then centrifuged, filtered, and dried in an oven at 80° C. for 12 h. A resulting dried solid was ground into a powder, and then vacuum-dried at 80° C. for 12 h to obtain an amorphous hierarchically porous UiO-66, labeled as am-UiO-66-3.

Comparative Example 1 Traditional Solvothermal Method (1) $ZrCl_4$ (0.159 g, 0.68 mmol) and 1,4-TPA ($H_2BDC$) (0.113 g, 0.68 mmol) were dissolved in DMF (30 mL) at room temperature separately. A resulting $ZrCl_4$ solution was mixed with a resulting 1,4-TPA solution and then transferred to a 50 mL reactor, reacted at 120° C. for 24 h, and crystallized, and a resulting product was then cooled and centrifuged to obtain a solid precipitate.

(2) The solid precipitate was washed 1 time with DMF at 40° C. A resulting solid was immersed in ethanol and washed 3 times, and then dried in a vacuum drying oven at 80° C. to obtain a crystalline UiO-66, labeled as UiO-66-solvent.

XRD analysis was conducted on the amorphous hierarchically porous UiO-66 prepared in Example 1 and the crystalline UiO-66 prepared in Comparative Example 1, and the results are shown in FIG. 1. As shown in FIG. 1, main peak position and peak intensity of the crystalline UiO-66 are consistent with those of standard UiO-66. While the amorphous hierarchically porous UiO-66 has only three broad "humps" caused by scattering, and the peak intensity is weak, indicating a typical feature of amorphous MOFs that could be easily distinguished from the crystalline UiO-66. In addition, crystallinity could also be detected from the peak intensity. According to FIG. 1, it is concluded that the amorphous hierarchically porous UiO-66 was prepared in Example 1 without obvious crystallization.

Figure 2:
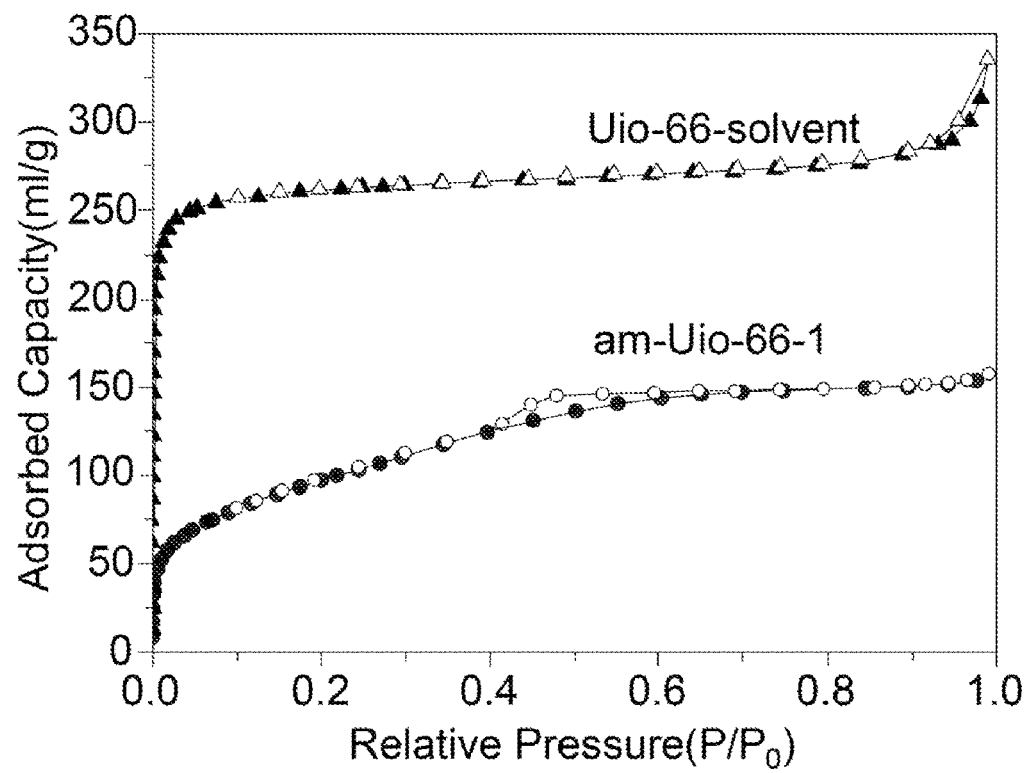
FIG. 2 shows a comparison of nitrogen adsorption isotherms of the amorphous hierarchically porous UiO-66 prepared in Example 1 and the crystalline UiO-66 prepared in Comparative Example 1 of the present disclosure.

The amorphous hierarchically porous UiO-66 prepared in Example 1 and the crystalline UiO-66 prepared in Comparative Example 1 were subjected to nitrogen adsorption isotherm analysis, and the results are shown in FIG. 2. As shown in FIG. 2, the adsorption isotherm of the crystalline UiO-66 has an obvious increase in adsorption amount in low-pressure section (relative pressure at 0 to 0.1), and then tends to be flat. This is a typical feature of type I adsorption isotherm, indicating that the crystalline UiO-66 was a microporous material. In contrast, the adsorption isotherm of the amorphous hierarchically porous UiO-66 has an obvious hysteresis loop at a relative pressure of 0.4 to 0.7 in addition to a significant increase in the low-pressure section. This is a typical feature of type IV adsorption isotherm, indicating that the amorphous hierarchically porous UiO-66 has a hierarchical pore structure.

Figure 3:
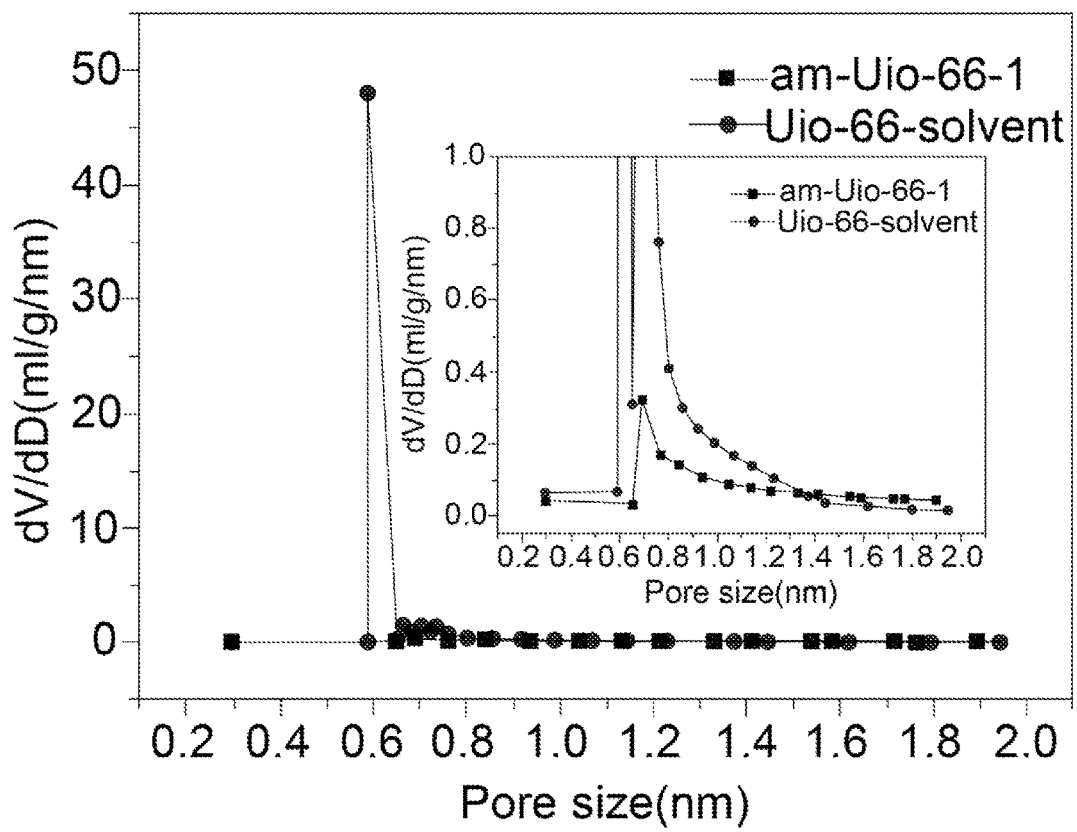
FIG. 3 shows micropore size distribution (calculated according to an H-K method) of the amorphous hierarchically porous UiO-66 prepared in Example 1 and the crystalline UiO-66 prepared in Comparative Example 1 of the present disclosure.
Figure 4:
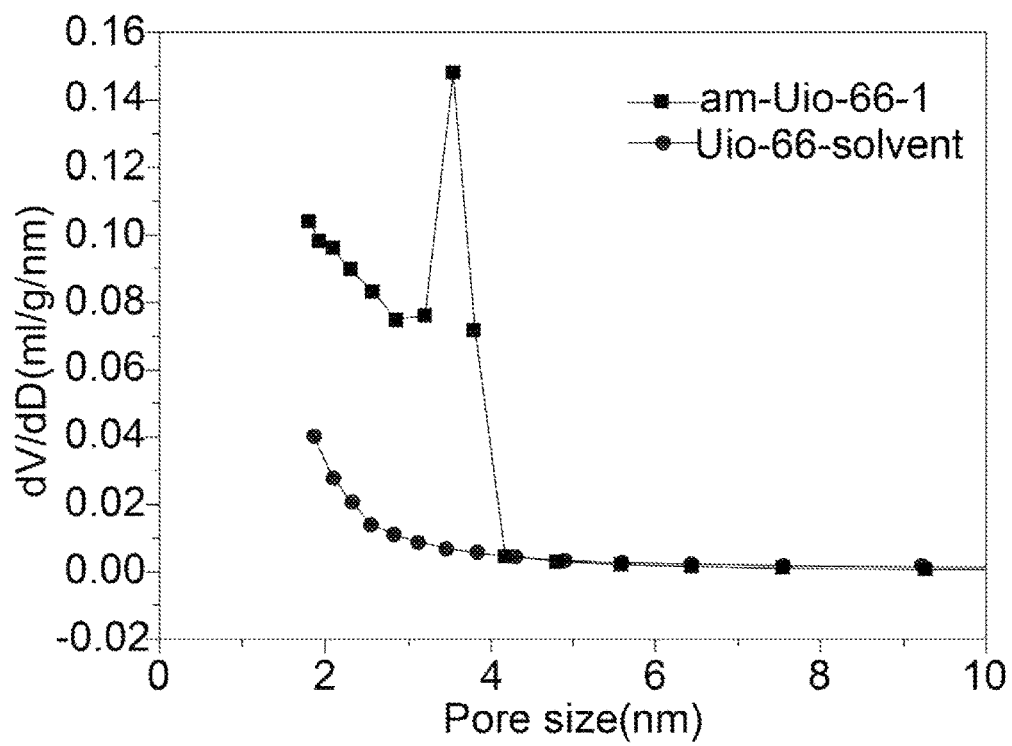
FIG. 4 shows mesopore size distribution (calculated based on a BJH desorption branch) of the amorphous hierarchically porous UiO-66 prepared in Example 1 and the crystalline UiO-66 prepared in Comparative Example 1 of the present disclosure.

The pore size distribution of the amorphous hierarchically porous UiO-66 prepared in Example 1 and the crystalline UiO-66 prepared in Comparative Example 1 were analyzed, and the results are shown in FIG. 3 to FIG. 4. As shown in FIG. 3 and FIG. 4, both the amorphous hierarchically porous UiO-66 and the crystalline UiO-66 have a microporous structure, with pore sizes of 0.69 nm and 0.59 nm, respectively. In addition, the amorphous hierarchically porous UiO-66 provided in the present disclosure shows obvious mesoporous distribution at 3.56 nm, indicating that it is a hierarchical pore material.

Figure 5:
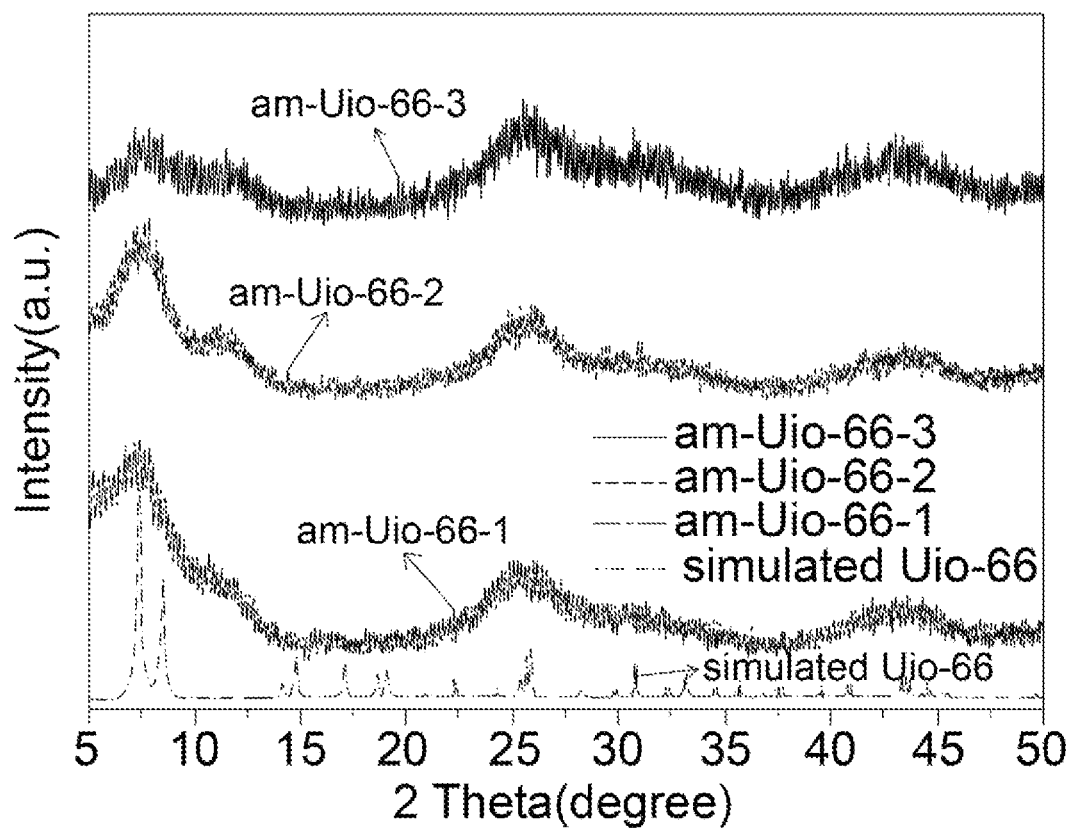
FIG. 5 shows XRD patterns of the amorphous hierarchically porous UiO-66 prepared in Examples 1 to 3 and the crystalline UiO-66 prepared in Comparative Example 1 of the present disclosure.

XRD analysis was conducted on the amorphous hierarchically porous UiO-66 prepared in Examples 1 to 3 and the crystalline UiO-66 prepared in Comparative Example 1, and the results are shown in FIG. 5. As shown in FIG. 5, by changing a ratio of PEG400 to water and a ratio of zirconium nitrate to TPA within the protection range, the prepared amorphous hierarchically porous UiO-66 has three wide "humps" caused by scattering at the same position. The above structure indicated that the amorphous hierarchically porous UiO-66 with a similar structure was prepared, indicating that the protection range of the present disclosure is desirable.

As can be seen from the examples, the method provided in the present disclosure has simple steps, high efficiency, and desirable biocompatibility, thus avoiding high energy consumption and toxic solvents in traditional methods. The amorphous hierarchically porous UiO-66 obtained by the present disclosure provides new possibilities for the application of MOFs in the biomedical field.

Although the present disclosure is described in detail in conjunction with the foregoing embodiments, they are only a part of, not all of, the embodiments of the present disclosure. Other embodiments can be obtained based on these embodiments without creative efforts, and all of these embodiments shall fall within the scope of the present disclosure.

What is claimed is:

1. A method for preparing an amorphous hierarchically porous UiO-66, comprising the following steps:
    (1) subjecting polyethylene glycol (PEG), zirconium nitrate, and water to a first heating mixing to obtain a metal solution;
    (2) subjecting ammonium fluoride, terephthalic acid (TPA), and water to a second heating mixing to obtain a ligand solution; and
    (3) mixing the metal solution and the ligand solution, and subjecting a resulting mixture to coordination at a temperature of 15° C. to 37° C. under normal pressure to obtain the amorphous hierarchically porous UiO-66; wherein
    steps (1) and (2) are conducted in any order;
    in step (2), a mass ratio of the ammonium fluoride to the TPA is in a range of 0.5-1.5:0.1-0.3, and a mass ratio of the ammonium fluoride to the water is in a range of 0.5-1.5:20; and
    a molar ratio of the zirconium nitrate to the TPA is in a range of 1-40:1.

2. The method of claim 1, wherein in step (1), the PEG is PEG400, the zirconium nitrate is $Zr(NO_3)_4 \cdot 5H_2O$, and the water is deionized water.

3. The method of claim 1, wherein in step (1), a volume ratio of the PEG to the water is in a range of 0.1-10:0.1-10.

4. The method of claim 1, wherein in step (1), a mass ratio of the water to the zirconium nitrate is in a range of 0.1-10:0.8-2.5.

5. The method of claim 1, wherein the first heating mixing is conducted by stirring at a temperature of 60° C. to 90° C. and a rotating speed of 500 rpm to 1,000 rpm for 0.5 hour to 3 hours.

6. The method of claim 1, wherein the second heating mixing is conducted by stirring at a temperature of 60° C. to 90° C. and a rotating speed of 500 rpm to 1,000 rpm for 0.5 hour to 3 hours.

7. The method of claim 1, wherein the coordination is conducted by stirring at a rotating speed of 500 rpm to 1,000 rpm for 24 hours to 72 hours.

8. The method of claim 2, wherein in step (1), a volume ratio of the PEG to the water is in a range of 0.1-10:0.1-10.

9. The method of claim 2, wherein in step (1), a mass ratio of the water to the zirconium nitrate is in a range of 0.1-10:0.8-2.5.

10. The method of claim 2, wherein the first heating mixing is conducted by stirring at a temperature of 60° C. to 90° C. and a rotating speed of 500 rpm to 1,000 rpm for 0.5 hour to 3 hours.

* * * * *